(12) United States Patent
Freyhoff et al.

(10) Patent No.: US 11,016,172 B2
(45) Date of Patent: May 25, 2021

(54) TESTING SYSTEM AND METHOD FOR TESTING THE PERFORMANCE OF A DETECTOR

(71) Applicant: Rohde & Schwarz GmbH & Co. KG, Munich (DE)

(72) Inventors: Thomas Freyhoff, Munich (DE); Steffen Heuel, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 217 days.

(21) Appl. No.: 16/188,576

(22) Filed: Nov. 13, 2018

(65) Prior Publication Data

US 2019/0154795 A1 May 23, 2019

(30) Foreign Application Priority Data

Nov. 21, 2017 (EP) .................................. 17202821

(51) Int. Cl.
*G01S 7/292* (2006.01)
*G01S 7/40* (2006.01)
(Continued)

(52) U.S. Cl.
CPC ............ *G01S 7/2927* (2013.01); *G01S 7/295* (2013.01); *G01S 7/4052* (2013.01); *G01S 13/5246* (2013.01); *G01S 2007/4086* (2013.01)

(58) Field of Classification Search
CPC ...... G01S 7/2927; G01S 7/4052; G01S 7/295; G01S 13/5246; G01S 2007/4086; G01S 7/411
See application file for complete search history.

(56) References Cited

U.S. PATENT DOCUMENTS 2,874,380 A * 2/1959 Fuller ..................... G01S 7/282
   342/173
2,952,015 A * 9/1960 Eakin ....................... G01S 7/40
   342/168
(Continued)

FOREIGN PATENT DOCUMENTS

| CN | 103412292 B | 8/2015 | |
| CN | 104237861 B | 8/2016 | |
| WO | WO2012/101211 A1 * | 8/2012 | ............. G01S 7/411 |

OTHER PUBLICATIONS

European Search Report; Munich, Germany; Application EP 17 20 2821; completed May 2, 2018; dated May 14, 2018. (Year: 2018).*

(Continued)

*Primary Examiner* — Bernarr E Gregory
(74) *Attorney, Agent, or Firm* — Christensen O'Connor Johnson Kindness PLLC

(57) ABSTRACT

A testing system for testing the performance of a detector is described, comprising a target generator for generating a target and a control unit that comprises at least one of a processing sub-unit, an analyzing sub-unit and a calculation sub-unit. The control unit is connected to the target generator such that the control unit is configured to control the target generator for controlling the target generated. The target generator is configured to transmit signals to the detector and/or to receive signals from the detector. The control unit is further configured to receive and to process data related to a detected target by the detector wherein the control unit is configured to determine a constant false alarm rate based on the data received by the detector and/or the data of the target generator for characterizing the performance of the detector. Furthermore, a method for testing the performance of a detector is described.

16 Claims, 2 Drawing Sheets

(51) Int. Cl.
*G01S 7/295* (2006.01)
*G01S 13/524* (2006.01)
*G01S 13/00* (2006.01)

(56) References Cited

U.S. PATENT DOCUMENTS

| | | | | |
|---|---|---|---|---|
| 3,794,999 A * | 2/1974 | Gellekink | ............. | G01S 7/4021 342/168 |
| 4,622,556 A * | 11/1986 | Bryant | ...................... | G01S 7/40 342/16 |
| 5,012,251 A * | 4/1991 | Kennedy | ............... | G01S 7/4021 342/173 |
| 5,166,691 A * | 11/1992 | Chin | ..................... | G01S 7/4004 342/165 |
| 5,262,787 A * | 11/1993 | Wilson | .................. | G01S 7/4052 342/172 |
| 5,431,568 A * | 7/1995 | Fey | ....................... | G01S 7/4052 342/169 |
| 6,067,042 A * | 5/2000 | Lee | ....................... | G01S 7/4052 342/172 |
| 6,114,985 A | 9/2000 | Russell et al. | | |
| 6,255,985 B1 * | 7/2001 | Towner, III | ............. | G01S 7/295 342/159 |
| 8,237,603 B2 * | 8/2012 | Knapp | ................... | G01S 7/4021 342/21 |
| 8,401,830 B2 * | 3/2013 | Sarkkinen | .......... | H04B 17/0087 703/4 |
| 2006/0244654 A1 | 11/2006 | Cheng et al. | | |
| 2006/0267832 A1 * | 11/2006 | Newberg | .............. | G01S 7/4052 342/169 |

OTHER PUBLICATIONS

European Search Opinion; Munich, Germany; Application EP 17 202 821.9; dated May 14, 2018. (Year: 2018).*

McCarthy, D., et al. "Coexistence of LTE and Radar Systems, Methodology for Benchmarking Cooperative Radar Receiver Performance," IEEE International Symposium on Electromagnetic Compatibility & Signal/Power Integrity (EMCSI) pp. 714-718, Aug. 2017.

* cited by examiner

TESTING SYSTEM AND METHOD FOR TESTING THE PERFORMANCE OF A DETECTOR

FIELD OF THE DISCLOSURE

Embodiments of the present disclosure relate generally to a testing system for testing the performance of a detector. Further, embodiments of the present disclosure relate to a method for testing the performance of a detector.

BACKGROUND

In general, detectors used in several technical fields, for instance in the automotive sector, are usually a black box for the customer with regard to their performance as they do not output any performance factors that can be used for evaluating the performance of the detector. Thus, the customer of a certain detector is not enabled to evaluate the detector with regard to its performance. In the automotive sector, detectors like radar detectors are typically used wherein it is not possible to determine the performance of the radar detector by doing interference tests as the customer has no access to the spectrum and/or intermediate frequency data used by the detector. However, these data would be required in order to determine the performance of the detector.

Accordingly, there is a need for a testing system as well as a method enabling to determine the performance characteristics of a detector in an easy and cost efficient manner.

SUMMARY

Embodiments of the present disclosure provide a testing system for testing the performance of a detector, for example, a detector that transmit signals and receives reflected signals from a target, comprising a target generator for generating a target and a control unit that comprises at least one of a processing sub-unit, an analyzing sub-unit and a calculation sub-unit, wherein the control unit is connected to the target generator such that the control unit is configured to control the target generator for controlling the target generated, wherein the target generator is configured to transmit signals to the detector and/or to receive signals from the detector, wherein the control unit is configured to receive and to process data related to a detected target by the detector, and wherein the control unit is configured to determine a constant false alarm rate based on the data received by the detector and/or the data of the target generator for characterizing the performance of the detector.

Further, embodiments of the present disclosure provide a method for testing the performance of a detector, with the following steps:

generating a target with an initial detection capability, for example an initial radar cross section, by using a target generator;

varying the detection capability of the target generated until the target generated is not detected anymore by the detector; and determining the constant false alarm rate based on the data received by the detector and/or the data of the target generated being not detected by the detector.

Accordingly, the characteristics of the detector with regard to its performance can be characterized by determining the constant false alarm rate (CFAR) of the detector wherein the CFAR is gathered by using a certain testing scenario for the detector to be tested, for example, by generating a specific target allowing to identify the CFAR. Hence, the performance of the detector is determined by relying on the CFAR of the detector. The CFAR is gathered in an easy and cost efficient manner by varying the detection capability of the target generated by the target generator until a certain target is generated that cannot be detected by the detector anymore. The corresponding data can be used for determining the CFAR which in turn is an indication for the performance of the detector.

In some embodiments, the CFAR corresponds to a limit of the detector with regard to its sensitivity. Therefore, the CFAR may also be called CFAR limit. The CFAR is determined by the control unit that receives and processes the data of the detector to be tested based upon the target generated by the target generator. With the knowledge of the CFAR, the performance of the detector can be evaluated appropriately.

In general, the CFAR is used by a detector in order to distinguish real targets and erroneous targets due to noise and/or interfering signals exceeding the detection threshold of the detector wherein adaptive algorithms are used to take the sensed background into account, for example wherein the background corresponds to noise, clutter and interference. The CFAR varies the detection threshold as a function of the background sensed. Accordingly, the CFAR corresponds to an adaptive indication of the presence of at least one target.

Thus, the CFAR relates to an indication of the performance of the detector as it corresponds to the sensitivity of the detector, for example with regard to its hardware.

Hence, the CFAR can be deemed as a measure for the feasibility of the detector.

The CFAR detection relates to detecting target returns against a background of noise, clutter and interference.

The detection capability may be the radar cross section for a radar detector. However, the detection capability depends on the kind of detector to be tested. The detection capability may also correspond to the image resolution when testing a camera being the detector.

The control unit may be configured to control the target generator such that different target scenarios are applied, for example different targets generated, wherein the control unit is further configured to determine the target list for the different target scenarios. In some embodiments, the control unit is configured to determine the CFAR for a certain target scenario that relates to a target generated that cannot be detected by the detector anymore due to the CFAR (limit) of the detector. Accordingly, the CFAR determined for that target scenario defines a limit for the sensitivity of the specific detector. Therefore, the CFAR and/or the data related thereto, for instance the data used by the target generator for generating the appropriate target that cannot be detected anymore, are/is used to determine the performance of the detector.

Accordingly, the specific target generated by the target generator that cannot be detected by the detector anymore due to the CFAR provides the data used to determine the performance of the detector under test.

The detector under test (device under test) is considered as a black box such that no further specification of the detector is required despite the CFAR to be determined. This means that knowledge of the intermediate frequency and/or spectrum is not required in order to determine the performance of the (radar) detector. Hence, a customer is enabled to determine the characteristics of the detector easily by its own.

The target generator may be a target simulator that is configured to simulate certain target scenarios that are used for testing the detector, for example for determining the performance of the detector. The different target scenarios relate to different targets generated by the target generator in order to evaluate the performance characteristics of the detector.

The control unit, comprising at least one of a processing sub-unit, an analyzing sub-unit and a calculation sub-unit, represents the central test unit that receives and processes the data in an appropriate manner. As the control unit is configured to control the target generator, the control unit controls the target scenario applied during the testing of the performance of the detector, for example the target generated for the testing. This means that the control unit may be configured to adjust the target generator appropriately such that a certain target is simulated. The function of the control unit and/or any of its sub-units can be implemented in hardware, in software, or in a combination of hardware and software.

The different targets generated relate to the different target scenarios. Generally, the different targets or rather target scenarios may result in different signals exchanged between the target generator and the detector under test, for example in different signals provided by the target generator.

For instance, the detector transmits signals that may be received by the target generator. The target generator may be controlled by the control unit such that the target generator transmits signals deemed to be reflected signals of a (simulated) target in a certain range, with a certain speed (Doppler frequency), with a certain size (power level) and/or at a certain relative position (angle). These parameters used for defining the target may be set via the control unit appropriately.

The detector may receive the signals generated by the target generator and may process them appropriately wherein the data related to the signals received are forwarded to the control unit for further processing.

Hence, the control unit may calculate a target list related to the target scenario applied for testing purposes by applying the CFAR. The target list is determined automatically for the different target scenarios that may be applied during the testing. As mentioned above, the control unit is configured to adjust the target (scenario) applied such that no target is detected by the detector in order to determine the CFAR of the detector. Thus, the control unit is configured to determine the CFAR.

According to an aspect, the control unit is configured to vary the target provided by the target generator. Hence, different targets may be generated or rather simulated during the testing of the detector in order to evaluate the detector in a more accurate manner. In some embodiments, the targets are varied in order to approach the CFAR of the detector such that the CFAR can be determined.

As mentioned above, the control unit varies the target provided by the target generator in a certain operation or rather testing mode so as to determine a constant false alarm rate based on the data received by the detector and/or the data of the target generator.

Hence, the different targets used for determining the CFAR are calculated automatically.

For instance, the target generator is configured to sweep the power level, to adapt the range, to adapt the Doppler frequency and/or to adapt the angle of the target generated. Thus, different targets with regard to the parameters mentioned above can be generated in order to test the performance of the detector. In some embodiments, the different dependencies of the CFAR can be investigated.

Furthermore, the testing system may comprise an interference source that provides at least one interfering signal, for example wherein the interference source is an adjustable interference generator. Hence, interfering signals may be used for determining the performance of the detector with regard to interfering signals. As the interference source is adjustable, varying interfering signals may be used in order to determine the characteristics of the detector. In general, the adjustable interference generator ensures the testing of different interferences.

The interference source may be a signal generator being controlled by the control unit in an appropriate manner.

For instance, the interference source is configured to simulate at least one of a communication signal and another detector, for example wherein the other detector is simulated as being located adjacent to the detector under test. The communication signal may be a signal according to the telecommunication standard 5G that interfere with the signals used by the detector under test and/or the target generator. 5G communication signals are inter alia used in the automotive sector, for instance by car communication systems. Thus, the performance can be tested under real conditions.

Moreover, the interferer may be another sensor that is located next to the one under test. Thus, the detector may be tested under real conditions as several detector are typically used located next to each other. In a car, several (radar) detectors are typically used wherein these detectors are located next to each other such that interfering signals may occur that influence the performances of the detectors.

Alternatively or supplementarily, the target generator may simulate an interfering source simultaneously while generating the target. Thus, the interfering source is implemented in the target generator.

In general, different interference signals may be simulated by the testing system in an appropriate manner in order to test the detector, for example its performance, with regard to different situations representing real application conditions of the detector such as neighbored detectors and/or interfering communication signals.

According to another aspect, the control unit is configured to determine the constant false alarm rate for different interference scenarios. Thus, the constant false alarm rate may also be determined for different interference scenarios, for example in addition to different target scenarios. Thus, the detector may be tested under real conditions. Hence, the CFAR of the detector may be determined wherein the background (due to the inferences) is varied which typically influence the CFAR (limit) as already mentioned above.

According to an embodiment, a testing device is provided that has a housing, wherein the housing encompasses at least one of the control unit and the target generator. Thus, the testing system comprises a testing device comprising several units of the testing system such as the control unit and/or the target generator. In addition, the testing device may also comprise the interference source.

According to another embodiment, the interference source is formed separately with respect to the testing device. However, the interference source may be connected to the testing device, for example the control unit, such that the control unit is enabled to control the interference source appropriately, for example the interfering signals provided by the target generator.

The detector may be at least one of a radar detector, a light detection and ranging (LiDAR) detector, an ultrasonic detector, an echo detector and a time of flight (ToF) camera. Thus, different types of detectors may be used and tested by the testing system.

Generally, the detector may be a detector that is configured to transmit signals and to receive reflected signals of a target to be detected, for instance a car nearby.

Another aspect provides that the testing system comprises a hardware-in-the-loop simulation unit. The hardware-in-the-loop (HIL) simulation unit ensures that complex real-time embedded systems can be tested under real conditions being simulated appropriately.

According to an aspect, at least one of the power level, the range, the Doppler frequency and the angle of the target generated is varied in order to vary the detection capability of the target generated. Thus, different target scenarios as well as targets related thereto may be used for the testing of the detector.

According to another aspect, the detection capability is varied until the target generated is not detected anymore by the detector after at least one of the power level, the range, the Doppler frequency and the angle of the target generated has been varied. Thus, the CFAR test with varying detection capabilities as described above is done again for at least one further target scenario, for example another target generated.

Generally, the target scenario may result in a different background which in turn influences the CFAR. Thus, the CFAR can be determined in dependency of the background, for example the target scenario. Thus, the dependency of the CFAR is determined with regard to the parameters used for varying the target scenario.

Afterwards, a one-dimensional or multidimensional map may be outputted that corresponds to the level of the constant false alarm rate. Depending on the target scenarios applied during the testing of the detector, for example the parameters varied, several dimensions can be used for determining the CFAR of the detector which in turn is used for determining the performance of the detector.

Moreover, interference signals may be provided, wherein the detection capability of the target generated is varied until the target generated is not detected anymore by the detector. Thus, different interference scenarios may be applied during the testing of the detector in order to determine its performance in a most accurate manner. The CFAR will also be determined in dependency of the interfering signals (simulated).

The different interference scenarios may be applied in addition to the different target scenarios such that the CFAR has a multi dependency relating to the parameters used for varying the target and interference scenarios.

Generally, the characteristics and advantages mentioned with regard to the testing system also apply for the method in a similar manner and vice versa.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
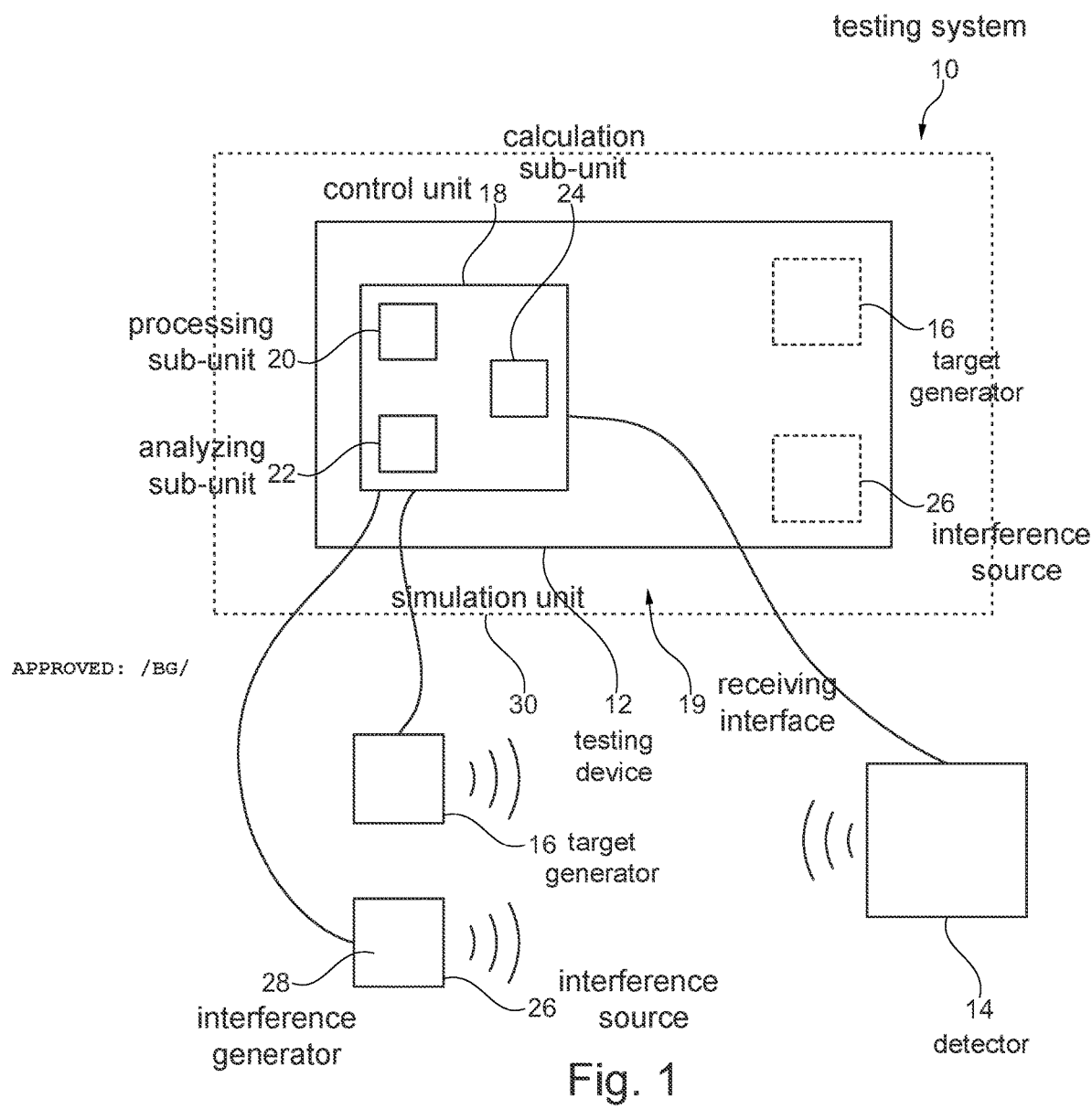
FIG. 1 schematically shows a testing system according to the present disclosure.

In FIG. 1, a testing system 10 is shown that comprises a testing device 12 as well as a detector 14 to be tested by the testing system 10. Thus, the testing system 10 is used for testing the performance of the detector 14.

The testing system 10 comprises a target generator 16 that generates a target for the detector 14 in order to evaluate the performance of the detector 14. Further, the testing system 10 has a control unit 18 that is connected with the target generator 16 wherein the control unit 18 is configured to control the target generator 16 in an appropriate manner as will be described later. Furthermore, the control unit 18 may receive the data used by the target generator 16 for generating a certain target.

In the shown embodiment, the testing device 12 comprises the control unit 18 whereas the target generator 16 is formed separately. However, the testing device 12 may also comprise the target generator 16 as indicated by the dashed illustrated target generator 16 such that the control unit 18 and the target generator 16 are incorporated in a single device, namely the testing device 12. In other words, the housing of the testing device 12 would encompass the target generator 16 and the control unit 18.

As shown in FIG. 1, the control unit 18 is also connected to the detector 14 such that the control unit 18 receives data related to a detected target by the detector 14 wherein the data or rather the detected target depends on the target generated by the target generator 16.

Accordingly, the testing device 12 comprises a receiving interface 19 for receiving the data of the detector 14.

Alternatively, the control unit 18 may be formed separately with regard to the testing device 12 such that no testing device 12 is needed for testing the detector 14.

In the shown embodiment, the control unit 18 comprises a processing sub-unit 20, an analyzing sub-unit 22 and a calculation sub-unit 24 that are used for processing and analyzing the data received appropriately. Moreover, the control unit 18 may perform calculations by using the calculation sub-unit 24 wherein the data received is taken into account. Thus, the control unit 18 represents the central test unit of the testing device 12.

In general, the testing device 12, for example the target generator 16, is configured to exchange signals with the detector 14. Hence, the target generator 16 is configured to transmit signals to the detector 14 that are received by the detector 14 and forwarded to the control unit 18 as described above. Further, the target detector 16 is configured to receive signals from the detector 14 wherein these signals may also be forwarded to the control unit 18.

In general, the detector 14 may be a detector that detects a target by transmitting signals and receiving the reflected signals from the target (simulated or rather generated). For instance, the detector 14 is a detector as typically used in the automotive sector such as a radar detector, a light detection and ranging (LiDAR) detector, an ultrasonic detector, an echo detector and/or a time of flight (ToF) camera. All these different detectors detect a target by receiving signals reflected by the target to be detected wherein the reflected signals correspond to signals that were previously transmitted by the detector 14.

For testing the detector 14, for example its performance, it is sufficient to transmit signals towards the detector 14 by the target generator 16 that correspond to a target simulated.

Furthermore, the testing device 12 comprises an interference source 26 that is configured to provide at least one interfering signal that may be used during the testing the performance of the detector 14. For instance, the interference source 26 is an adjustable interference generator 28 such that it is ensured that the characteristics of the detector 14 can be tested accurately as changing or different interference signals may be provided by the interference source 26.

In some embodiments, different interference scenarios can be tested by varying the interfering signals appropriately. For instance, the interference source 26 is configured to simulate a communication signal such as a communication signal according to the 5G telecommunication standard. In addition or alternatively, the interference source 26 is configured to simulate another detector, for example another detector of the same type as the detector 14 under test, wherein the other detector is simulated as being a detector located adjacent to the detector 14 under test.

The interference source 26 may be connected with the control unit 18 ensuring that the control unit 18 is enabled to control the interference source 26. Hence, the control unit 18 is configured to apply a certain interfering scenario during the testing of the detector 14. Accordingly, the central control unit 18 may control the target scenario as well as the interference scenario. Alternatively to the shown embodiment, the interference source 26 may be part of the testing device 12 as indicated by the dashed lines again.

Further, the control unit 18 that receives the data from the detector 14 and/or from the target generator 16 is further configured to process the data appropriately in order to determine or rather evaluate a target list of the detector 14. In addition, the control unit 18 is configured to process the data received such that a constant false alarm rate (CFAR) can be determined based on the data received. Hence, the performance of the detector 14 may be evaluated by taking the CFAR into account as will be described with reference to FIG. 2 later.

For this purpose, the control unit 18 is configured to control the target generator 16 such that the target generated or simulated by the target generator 16 is adapted upon control signals of the control unit 18.

In some embodiments, the target generator 16 is configured to vary the detection capability of the target generated upon control signals of the control unit 18 until a target is generated that cannot be detected by the detector 14 anymore. Thus, the control unit 18 is configured to vary the target generated. The data corresponding to this target that cannot be detected anymore is then used by the control unit 18 to determine the CFAR of the detector 14 in order to evaluate the performance of the detector 14.

In case of a radar detector, the radar cross section (detection capability) of the target generated is varied appropriately until the detector 14 cannot detect a target anymore in order to determine the CFAR of the detector 14.

Hence, the control unit 18 is generally configured to control the target generator 16 in order to use different target scenarios for the testing of the detector 14. The different target scenarios may be achieved by sweeping the power level, adapting the range, adapting the Doppler frequency and/or adapting the angle of the target generated by the target generator 16. These different parameters are set by the control unit 18.

As already mentioned above, the control unit 18 is connected with the interference source 26. Accordingly, the control unit 18 is further generally configured to control the interfering signals provided by the interference source 26. Thus, different interference scenarios may also be applied for testing the detector 14, for example in addition to the different target scenarios provided by the target generator 16 upon appropriate controlling of the control unit 18.

Thus, the control unit 18 is configured to determine the CFAR of the detector 14 for different target scenarios and/or different interference scenarios, for example wherein the CFAR is determined in order to evaluate the performance of the detector 14 under test. As the detector 14 is tested by the testing system 10, the detector 14 may also be called device under test.

The CFAR determined, for example while applying different target scenarios and/or different interference scenarios, may be outputted as a one-dimensional or multidimensional map depending on the different parameters used during the testing that have been varied. For instance, the above mentioned parameters for the target scenario variation as well as the interfering signals may be used as variables for the multidimensional map.

In general, the CFAR can be outputted via a certain interface, for instance a CAN, USB, LAN interface or a similar interface typically used for data transmission.

In other words, the CFAR threshold or the CFAR limit of the detector 14 is searched by varying the detection capability of the target simulated by the target generator 16 wherein this variation is controlled by the control unit 18.

Since the target for the detector 14 is generated or rather simulated by the target generator 16 as well as the interfering signal is generated or rather simulated by the interference source 26, the testing system 10 comprises a hardware-in-the-loop simulation unit 30 that is used for testing the detector 14 being part of a complex system in real-time.

Figure 2:
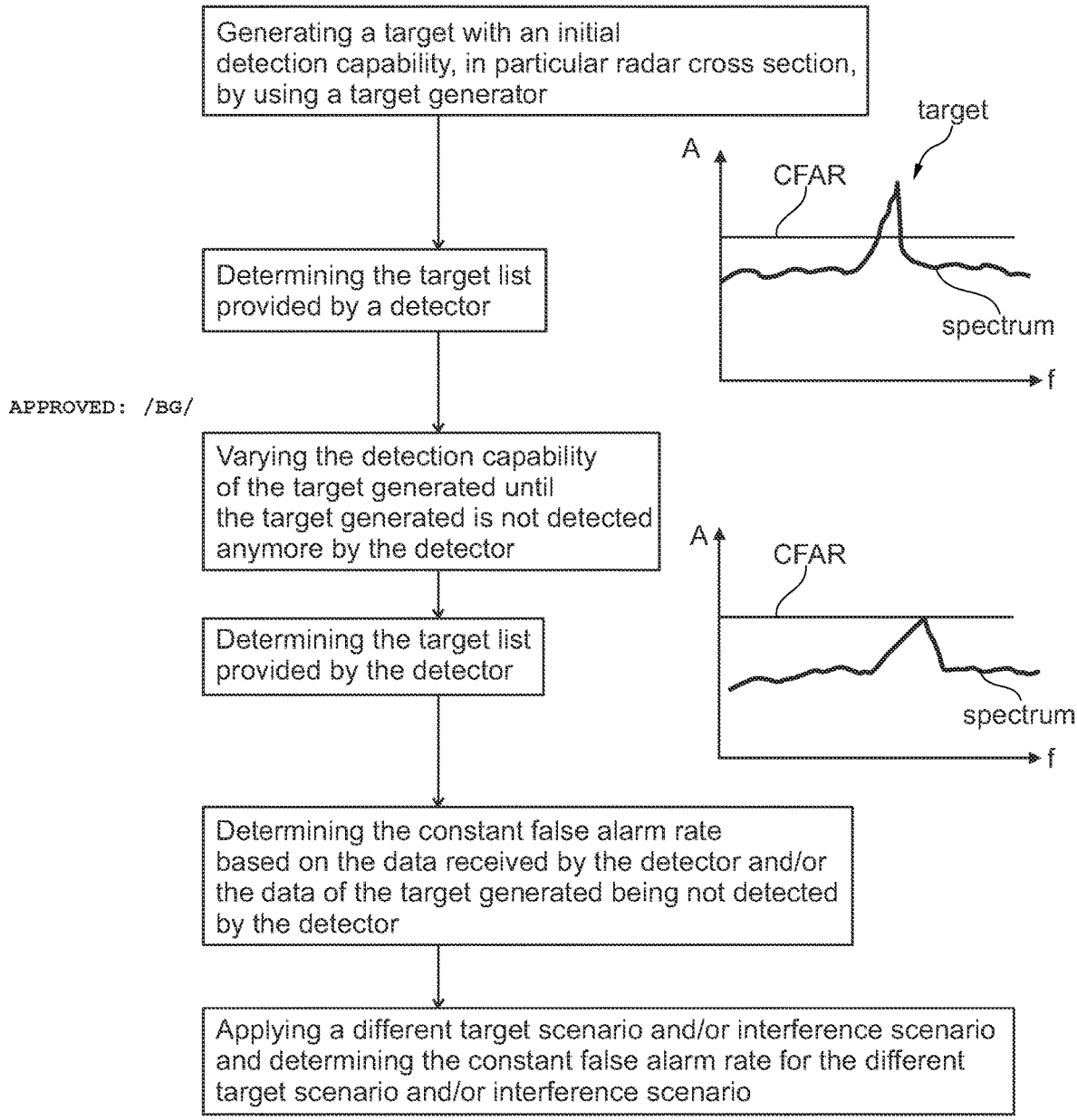
FIG. 2 shows an overview representing a method for testing the performance of the detector according to the present disclosure.

In FIG. 2, a representative overview is shown that illustrates the testing scenario for testing the performance of a radar detector 14 used in the automotive sector. Hence, the detector 14 is tested by the testing system 10 which generates a target with an initial detection capability, namely an initial radar cross section, wherein the target is generated by the target generator 16.

The detector 14 receives data from the target generator 16 simulating the reflected signals of a certain target simulated. The appropriate data received by the detector 14 (as well as the data related to the target generated) are forwarded to the control unit 18 that processes the data appropriately. In some embodiments, the control unit 18 evaluates whether the detector 14 has detected a target; please refer to the first image in FIG. 2. Thus, the control unit 18 determines the target list of the detector 14 based on the data received by the detector 14. Alternatively, the detector 14 itself determines the target list and forwards this target list to the control unit 18 for further processing.

In case that a target is identified (signal higher than CFAR) by the testing system 10, for example by the detector 14 and the control unit 18 connected to the detector 14, the detection capability, namely the radar cross section, of the target generated is varied until the detector 14 cannot detect a target anymore.

In a similar manner as mentioned above, the target list for the varied detection capability, namely the varied radar cross section, is determined as described above; please refer to the second image in FIG. 2.

While doing so, the constant false alarm rate of the detector 14 can be determined based on the detection capability or rather the radar cross section of the corresponding target (scenario applied) that cannot be detected by the detector 14 anymore.

For this purpose, the control unit 18 takes the data received by the detector 14 and/or the data of the target generated into account, namely the data used by the target generator 16 for generating the target that cannot be detected by the detector 14 anymore.

After having identified the constant false alarm rate related to the detector 14, for example the CFAR limit or rather the CFAR threshold, the performance characteristics of the detector 14 can be evaluated in an appropriate manner.

As already mentioned above, different testing scenarios, for example different target scenarios and/or different interfering scenarios, may be applied for determining the CFAR depending on multiple variables. In fact, the dependency of the CFAR can be investigated while doing so. For instance, the testing scenario, for example the target scenario, may be varied by alternating at least one of the power level, the range, the Doppler frequency and the angle of the target generated.

Alternatively or supplementarily, the testing scenario may be varied by controlling the interference source 26 in an appropriate manner such that a certain interfering signal is provided (interference scenario). Thus, an interference scenario is applied that influences the background and, therefore, the CFAR applied by the detector 14.

In addition, different interference scenarios may be applied for testing the detector 14.

In general, the radar cross section of the target generated is varied for the testing scenario applied, for example the target scenario and/or the interference scenario, until the target is not detected anymore by the detector 14 as described above such that the constant false alarm rate is determined for the specific testing scenario applied.

Generally, the testing scenario may comprise a certain target scenario and/or a certain interference scenario.

By this method, it is ensured that the performance of the detector 14 can be determined in an easy and cost efficient manner by the costumer as no access to the spectrum and/or the intermediate frequency is required. The method for determining the performance of the detector 14 can be performed, for example, by the testing system 10.

It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks. The term computer can include any processing structure, including but is not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

In an embodiment, the control unit includes a microprocessor and a memory storing logic modules and/or instructions for carrying out the function(s) of the control unit and/or any of its sub-units, either separately or in any combination. In an embodiment, the control unit includes one or more ASICs having a plurality of predefined logic components. In an embodiment, the control unit includes one or more FPGA having a plurality of programmable logic components. In an embodiment, the control unit includes hardware circuit implementations (e.g., implementations in analog circuitry, implementations in digital circuitry, and the like, and combinations thereof). In an embodiment, the control unit includes combinations of circuits and computer program products having software or firmware instructions stored on one or more computer readable memories that work together to cause a device to perform one or more methodologies or technologies described herein.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A testing system for testing the performance of a detector, comprising: a target generator for generating a target and a control unit that comprises at least one of a processing sub-unit, an analyzing sub-unit and a calculation sub-unit, wherein the control unit is connected to the target generator such that the control unit is configured to control the target generator for controlling the target generated, wherein the target generator is configured to transmit signals to the detector and/or to receive signals from the detector, wherein the control unit is configured to receive and to process data related to a detected target by the detector, and wherein the control unit is configured to determine a constant false alarm rate based on the data received by the detector and/or the data of the target generator for characterizing the performance of the detector, wherein the constant false alarm rate is gathered by varying the detection capability of the target generated by the target generator until a certain target is generated that cannot be detected by the detector anymore.

2. The testing system according to claim 1, wherein the control unit is configured to vary the target provided by the target generator.

3. The testing system according to claim 1, wherein the target generator is configured to sweep the power level, to adapt the range, to adapt the Doppler frequency and/or to adapt the angle of the target generated.

4. The testing system according to claim 1, wherein the testing system comprises an interference source that provides at least one interfering signal.

5. The testing system according to claim 4, the interference source is an adjustable interference generator.

6. The testing system according to claim 4, wherein the interference source is configured to simulate at least one of a communication signal and another detector.

7. The testing system according to claim 4, wherein the interference source is configured to simulate another detector, and wherein the another detector is simulated as being located adjacent to the detector under test.

8. The testing system according to claim 1, wherein the control unit is configured to determine the constant false alarm rate for different interference scenarios.

9. The testing system according to claim 1, wherein a testing device is provided that has a housing, wherein the housing encompasses at least one of the control unit or the target generator.

10. The testing system according to claim 1, wherein the detector is at least one of a radar detector, a light detection and ranging detector, an ultrasonic detector, an echo detector and a time of flight camera.

11. The testing system according to claim 1, wherein the testing system comprises a hardware-in-the-loop simulation unit.

12. A method for testing the performance of a detector, with the following steps:
generating a target with an initial detection capability by using a target generator;
varying the detection capability of the target generated until the target generated is not detected anymore by the detector; and
determining the constant false alarm rate based on the data received by the detector and/or the data of the target generated being not detected by the detector,
wherein the constant false alarm rate is gathered by varying the detection capability of the target generated by the target generator until a certain target is generated that cannot be detected by the detector anymore.

13. The method according to claim 12, wherein at least one of the power level, the range, the Doppler frequency or the angle of the target generated is varied in order to vary the detection capability of the target generated.

14. The method according to claim 13, wherein the detection capability is varied until the target generated is not detected anymore by the detector after at least one of the power level, the range, the Doppler frequency or the angle of the target generated has been varied.

15. The method according to claim 12, wherein a one-dimensional or multidimensional map is outputted that corresponds to the level of the constant false alarm rate.

16. The method according to claim 12, wherein interference signals are provided, wherein the detection capability of the target generated is varied until the target generated is not detected anymore by the detector.

* * * * *